(12) United States Patent
Faulring et al.

(10) Patent No.: US 8,251,863 B2
(45) Date of Patent: Aug. 28, 2012

(54) CONTINUOUSLY VARIABLE TRANSMISSION WITH MULTIPLE OUTPUTS

(75) Inventors: Eric L. Faulring, Alexandria, VA (US); Thomas Moyer, Salt Lake City, UT (US); Julio Santos-Munne, Glenview, IL (US); Alexander Makhlin, Chicago, IL (US); J. Edward Colgate, Evanston, IL (US); Michael Peshkin, Evanston, IL (US)

(73) Assignee: HDT Robotics, Inc., Fredericksburg, VA (US)

( * ) Notice: Subject to any disclaimer, the term of this patent is extended or adjusted under 35 U.S.C. 154(b) by 920 days.

(21) Appl. No.: 11/849,953

(22) Filed: Sep. 4, 2007

(65) Prior Publication Data

US 2008/0081728 A1     Apr. 3, 2008

Related U.S. Application Data

(60) Provisional application No. 60/841,710, filed on Sep. 1, 2006.

(51) Int. Cl.
*F16H 15/40*     (2006.01)
(52) U.S. Cl. .......................... 476/38; 74/490.01; 901/20
(58) Field of Classification Search .............. 476/36–38; 74/721, 490.01; 901/20
See application file for complete search history.

(56) References Cited

U.S. PATENT DOCUMENTS

| | | | | |
|---|---|---|---|---|
| 1,229,879 A | * | 6/1917 | Buffat | 476/38 |
| 1,374,049 A | * | 4/1921 | White | 74/665 T |
| 2,002,585 A | * | 5/1935 | Rothwell, Jr. et al. | 476/33 |
| 2,234,337 A | * | 3/1941 | Essex et al. | 476/38 |
| 2,727,396 A | * | 12/1955 | Haugwitz | 476/5 |
| 5,303,796 A | * | 4/1994 | Tanaka et al. | 180/233 |
| 5,496,226 A | * | 3/1996 | Splittstoesser et al. | 476/24 |
| 5,923,139 A | | 7/1999 | Colgate et al. | |
| 5,952,796 A | | 9/1999 | Colgate et al. | |
| 6,471,618 B2 | * | 10/2002 | Pavlov et al. | 476/52 |
| 6,686,911 B1 | | 2/2004 | Levin et al. | |

OTHER PUBLICATIONS

Book, W., R. Charles, et al. (1996). The concept and implementation of a passive trajectory enhancing robot. International Mechanical Engineering Congress and Exposition, ASME.

Colgate, J. and J. Brown, (May 1994), Factors Affecting the Z-Width of a Haptic Display. IEEE International Conference on Robotics & Automation, pp. 3205-3210, San Diego, CA.

James E. Colgate, Michael A. Peshkin, Witaya Wannasuphoprasit, Nonholonomic Haptic Display, Proceedings of the IEEE 1996 International Conference on Robotics and Automation, Philadelphia.

Eric L. Faulring, J. Edward Colgate and Michael A. Peshkin, (2004), A High Performance 6-DOF Haptic Cobot. IEEE International Conference on Robotics and Automation.

(Continued)

*Primary Examiner* — William C Joyce
(74) *Attorney, Agent, or Firm* — Gardere Wynne Sewell LLP; Marc A. Hubbard

(57) ABSTRACT

A transmission or actuator offering multiple rotational outputs proportionate in speed to that of a common rotational input, each output according to its own ratio. The ratios are continuously variable between positive and negative values, including zero, and may be varied by electromechanical actuators under computer control. The transmission relates the output speeds one to another under computer control, and thus makes possible the establishment of virtual surfaces and other haptic effects in a multidimensional workspace to which the transmission outputs are kinematically linked. An example of such a workspace is that of a robotic or prosthetic hand.

19 Claims, 5 Drawing Sheets

OTHER PUBLICATIONS

Eric Faulring; J. Edward Colgate; Michael A. Peshkin (2005), High Performance Cobotics, IEEE 9th International Conference on Rehabilitation Robotics, Jun. 28, 2005.

Gillespie, R.B.; Colgate, J.E.; Peshkin, M.A., (2001), A general framework for cobot control, IEEE Transactions on Robotics and Automation, 17(4) p. 391, Aug. 2001.

Carl Moore, Michael A. Peshkin, J. Edward Colgate, (2003),Cobot Implementation of Virtual Paths and 3D Virtual Surfaces, IEEE Transactions on Robotics and Automation, 19(2), p. 347-351, Apr. 2003.

Michael A. Peshkin, J. Edward Colgate, Witaya Wannasuphoprasit, Carl Moore, Brent Gillespie, (2001), Cobot architecture, IEEE Transactions on Robotics and Automation, 17(4), p. 377, Aug. 2001.

R. Brent Gillespie, Carl A. Moore, Michael Peshkin, J. Edward Colgate, Kinematic Creep in a Continuously Variable Transmission: Traction Drive Mechanics for Cobots, Journal of Mechanical Design, Dec. 2002, vol. 124, p. 713-722.

Carl. A. Moore, Michael A. Peshkin, J. Edward Colgate, Design of a 3R Cobot Using Continuously Variable Transmissions, 1999 International Conference on Robotics and Automation, Detroit, MI.

Greg Paula, Cobots for the Assembly Line, 1997 American Society of Mechanical Engineers, 7 pages.

Carl A. Moore, Continuously Variable Transmission for Serial Link Cobot Architectures, Degree of Masters of Science in Mechanical Engineering, Northwestern University, Mar. 17, 1997, 81 pages.

"Development of a 6 Power-Roller Half-Toroidal CVT—Mechanism and Efficiency," Hirohisa Tanaka, et al.; 2004 International Continuously Variable and Hybrid Transmission Congress, Sep. 23-25, 2004, San Francisco, CA; (6 pages).

Mantriota, Giacomo, "Performances of a series infintely variable transmission with type I power flow," Mechanism and Machine Theory 37 (2002) 579-597 (19 pages).

\* cited by examiner

CONTINUOUSLY VARIABLE TRANSMISSION WITH MULTIPLE OUTPUTS

This application claims the benefit of U.S. provisional patent application No. 60/841,710, filed Sep. 1, 2006, which is incorporated herein by reference for all purposes.

The U.S. Government has a paid-up license in this invention and the right in limited circumstances to require the patent owner to license others on reasonable terms as provided for by the terms of Subcontract No. 068702 under U.S. Government Prime Contract No. N66001-06-C-8005, for which the Space and Naval Warfare Systems Center is the contracting activity.

BACKGROUND OF THE INVENTION

Passive robots intended for collaboration with a human operator, which are sometimes called "cobots," move in response to a force that a user manually applies to its end point. Limits or constraints placed on the end point position determine the end point trajectory, while the energy to move the end point along the trajectory is supplied by the user. These limits collectively define "virtual surfaces" which separate a workspace into free regions, in which a user may freely move the end point of the cobot, and restricted regions, in which the user cannot freely move the end point.

Although cobots may utilize motors, the motors are not used to move the end point along the trajectory. Unlike motor actuated joints of conventional robots, the joints of a cobot include nonholonomic elements. Revolute joints in cobots are commonly formed using continuously variable transmissions as a nonholonomic element. A continuously variable transmission (CVT) is one that can vary its transmission ratio over a continuous, predefined range of values. A continuously variable transmission that can vary its transmission ratio over a continuous range of values including zero and including reversal (negative values) is sometimes referred to as an infinitely variable transmission.

Examples of cobots and CVTs used by them are disclosed in the following publications, all of which are incorporated herein by reference: Book, W., R. Charles, et al. (1996). *The concept and implementation of a passive trajectory enhancing robot*. International Mechanical Engineering Congress and Exposition, ASME; Colgate, J. and J. Brown (1994). *Factors Affecting the Z-Width of a Haptic Display*. IEEE International Conference on Robotics & Automation, San Diego, Calif.; James E. Colgate, Michael A. Peshkin, Witaya Wannasuphoprasit, *Nonholonomic Haptic Display*, Proceedings of the IEEE 1996 International Conference on Robotics and Automation, Philadelphia; Eric L. Faulring, J. Edward Colgate and Michael A. Peshkin, (2004) *A High Performance 6-DOF Haptic Cobot*. IEEE International Conference on Robotics and Automation; Eric Faulring.; J. Edward Colgate; Michael A. Peshkin (2005), *High Performance Cobotics*. IEEE 9th International Conference on Rehabilitation Robotics, Jun. 28, 2005; Gillespie, R. B.; Colgate, J. E.; Peshkin, M. A., (2001), A general framework for cobot control, IEEE Transactions on Robotics and Automation, 17(4) p. 391, August 2001; Carl Moore, Michael A. Peshkin, J. Edward Colgate, (2003), *Cobot Implementation of Virtual Paths and 3D Virtual Surfaces*, IEEE Transactions on Robotics and Automation, 19(2), p. 347-351, April 2003; and Michael A. Peshkin, J. Edward Colgate, Witaya Wannasuphoprasit, Carl Moore, Brent Gillespie, (2001), *Cobot architecture*, IEEE Transactions on Robotics and Automation, 17(4), p. 377, August 2001. Cobots and cobot transmissions are also disclosed in U.S. Pat. Nos. 6,686,911, 5,952,796, and 5,923,139, which are also incorporated herein by reference.

Conventional electromechanical systems often do not use continuously variable transmissions and are limited to a fixed gear ratio. Subsequently the combination of a specific actuator and a single gear ratio may not be able to output a target maximum effort at low speed, since the fixed gearing causes the actuator to operate at a power inefficient speed. Thus a much larger actuator and a larger power supply must be chosen to satisfy the maximum speed and maximum effort requirements, given the fixed gear ratio, causing the system to operate at power inefficient speeds. This larger actuator likely has the capacity to deliver more power than is needed at certain speeds.

SUMMARY OF THE INVENTION

Multiple-degree-of-freedom systems for many applications often require multiple actuators that are oversized in terms of power. This leads to heavy systems. Heavy systems tend to be less safe and mobile, and to require more power. Applications such as prosthetic and robotic hands and arms require a wide range of torques and speeds to actuate joints to approach human capability, and possess a large number of joints, such as fingers, that are preferably actuated independently. However, such applications also impose significant size and weight restrictions on the system.

In accordance with a preferred embodiment of the invention, a transmission or actuator includes an input driving multiple outputs, each output having an independently and continuously variable transmission ratio. This transmission permits a single, powered actuator to be shared for driving multiple outputs, permitting more efficient utilization of power and savings of weight and space without sacrificing the ability to independently control each output with, for example, a computer. Such a transmission is particularly useful and used to advantage in robotic systems, such as cobots, requiring the establishment of mechanically constrained velocity ratios among several degrees of freedom in a workspace, with the velocity ratios being continuously adjustable under computer control. The transmission establishes the necessary velocity ratios and allows them to be independently varied under computer control.

DESCRIPTION OF PREFERRED EMBODIMENTS

Figure 1:
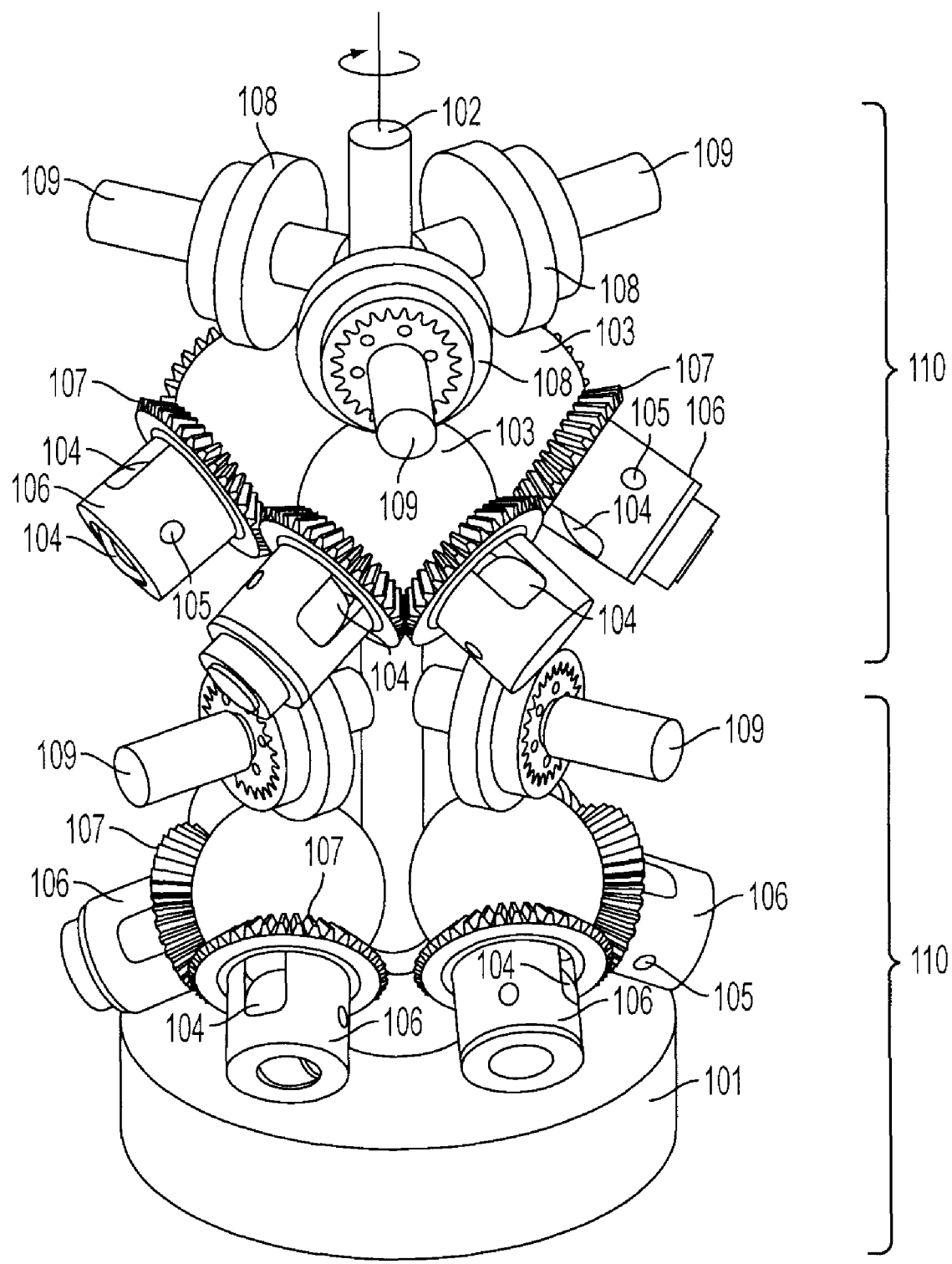
FIG. 1 illustrates certain components of a transmission having a single drive shaft coupled with a plurality of CVTs, with support structures omitted.

In the example illustrated in the accompanying figures, and described in detail below, a plurality of continuously variable transmission units (CVTs) are arrayed circumferentially around a common rotating shaft. The shaft is connected to a source of input rotational motion, for example an electric motor. Additional arrays can be distributed along the length of the common shaft. Each CVT enables rapid, accurate and independent adjustment of the transmission ratio of each output by means of a computer. The transmission thus easily permits relating output speeds one to another under computer control, making possible the establishment of virtual surfaces and other haptic effects in a multidimensional workspace to which the transmission outputs are kinematically linked. An example of such a workspace is that of a robotic or prosthetic hand. With continuously variable ratios, each CVT further enables extending the range of capabilities of the input motor beyond the range of speed and torque otherwise available with a fixed ratio transmission, which is desirable for many applications.

In this example, it is preferred that a CVT unit is comprised of a sphere which conveys motion from the common rotating shaft to an output roller, with the axis of rotation of the output roller orthogonal to the axis of rotation of the common rotating shaft. The axis of rotation of the sphere determines the transmission ratio from the common rotating shaft to output roller. The sphere's axis of rotation is determined by the axes of rotation of two steering rollers that also contact the sphere. These rollers are preferably passive (non-driven). Steering the rollers changes the transmission ratio from common rotating shaft to the output roller. Four points of contact of the sphere with the two shafts and two rollers are sufficient, in this example, to fully constrain the sphere except for rotation. The common rotating shaft, sphere, output roller, and steering rollers are preferably made of hard materials. In a preferred embodiment they are made of steel. Surface coatings may be used to enhance the hardness of the surface, its wear resistance, and rolling traction. Ceramic materials or coatings may also be used for these purposes. Traction fluids may also be used to increase rolling traction.

As a consequence of the use of rolling constraints each CVT also independently possesses the ability to adjust its backdrivability, or impedance as seen at the output, varying from completely locked to completely free. Each may be independently locked by setting their speed to zero with minimal dissipation of heat. Thus in a prosthetics application, for example, joints can be clutched under heavy loads, or unlocked under power failure, without the presence of additional clutch or brake actuators. In the example described below, the transmission permits a wide range of mechanical impedances to be rendered to n degrees of freedom, using n+1 actuators and n continuously variable transmissions. Furthermore, such transmissions tend to exhibit low reflected inertia, as ascertained from an actuated joint connected to one of its outputs, and, due to the absence of gear teeth, to operate with little vibration and sound.

Turning now to a description of the accompanying figures, the same reference numbers refer to the same elements throughout the specification and drawings.

Referring to FIG. 1, common rotating shaft 102 may be driven by a rotational actuator 101, such as an electric motor, preferably a DC brushless servomotor. In an alternate, passive embodiment common rotating shaft 102 is not driven by a rotational actuator.

The angular orientation of common rotating shaft 102 is measured by an orientation measuring device, for example an optical encoder. This device is not illustrated. Use of such devices for this purpose is well known. The angular velocity of common rotating shaft 102 may also be measured. The angular velocity can be measured or determined in any of a variety of well known ways. In a preferred embodiment the angular position is measured by an encoder, and the angular velocity is derived from the angular position by numerical differentiation. Common rotating shaft 102 is rotatably supported in a stationary support structure, such as a body of the transmission, by bearings. Neither the body nor the bearings are shown in FIG. 1.

Common rotating shaft 102 contacts a plurality of spheres 103. The spheres are in rolling contact with the shaft, such that rotation of the shaft causes rotation of each sphere 103 about its center. At least two, and preferably three or more, of the plurality spheres 103 are arrayed preferably symmetrically around the axis of the shaft in a layer 110. The centers of the spheres in a single layer preferably lie within a common plane. Additional layers may be disposed along common rotating shaft 102. In the example shown in FIG. 1, there are two layers each containing three spheres 103.

Each sphere 103 is also in rolling contact with two steering rollers 104, such that the orientations of the axes of rotation of the two steering rollers 104 constrain the orientation of the axis of rotation of sphere 103 that the two steering rollers contact. These rollers are preferably not driven, and thus completely passive. Each steering roller 104 is rotatably attached to an axle 105 within a steering cup 106. Steering cup 106 is rotatably attached to the body (not shown in FIG. 1) of the transmission by bearings, such that the contact point between steering roller 104 and sphere 103 is stationary as steering cup 106 rotates. Each pair of steering cups 106 contacting a single sphere 103 are synchronized in their orientations by a synchronization mechanism, which may be mechanical or electromechanical. In this example, a pair synchronization gears 107, each coupled with a respective steering cup, mesh with each other. Preferably the two synchronization gears 107 are 45 degree bevel gears. The steering of the two rollers contacting one sphere is driven by one or two motors. These motors are preferably under computer control. (The computer is not shown in the figures.) In a preferred embodiment the steering angles of the two rollers are synchronized by gears and thus only one motor is needed.

Each sphere 103 is also in rolling contact with output roller 108, such that rotation of sphere 103 causes rotation of output roller 108. Output roller 108 is rotatably supported to the body of the transmission (not shown in FIG. 1) by bearings. Each sphere 103, pair of contacting steering rollers 104, and contacting output roller 108 comprises an example of a preferred form of continuously variable transmission (CVT), having a transmission ratio between the common rotating shaft 102 and the output roller 108 determined by the steering angles of the steering rollers 104.

Figure 2:
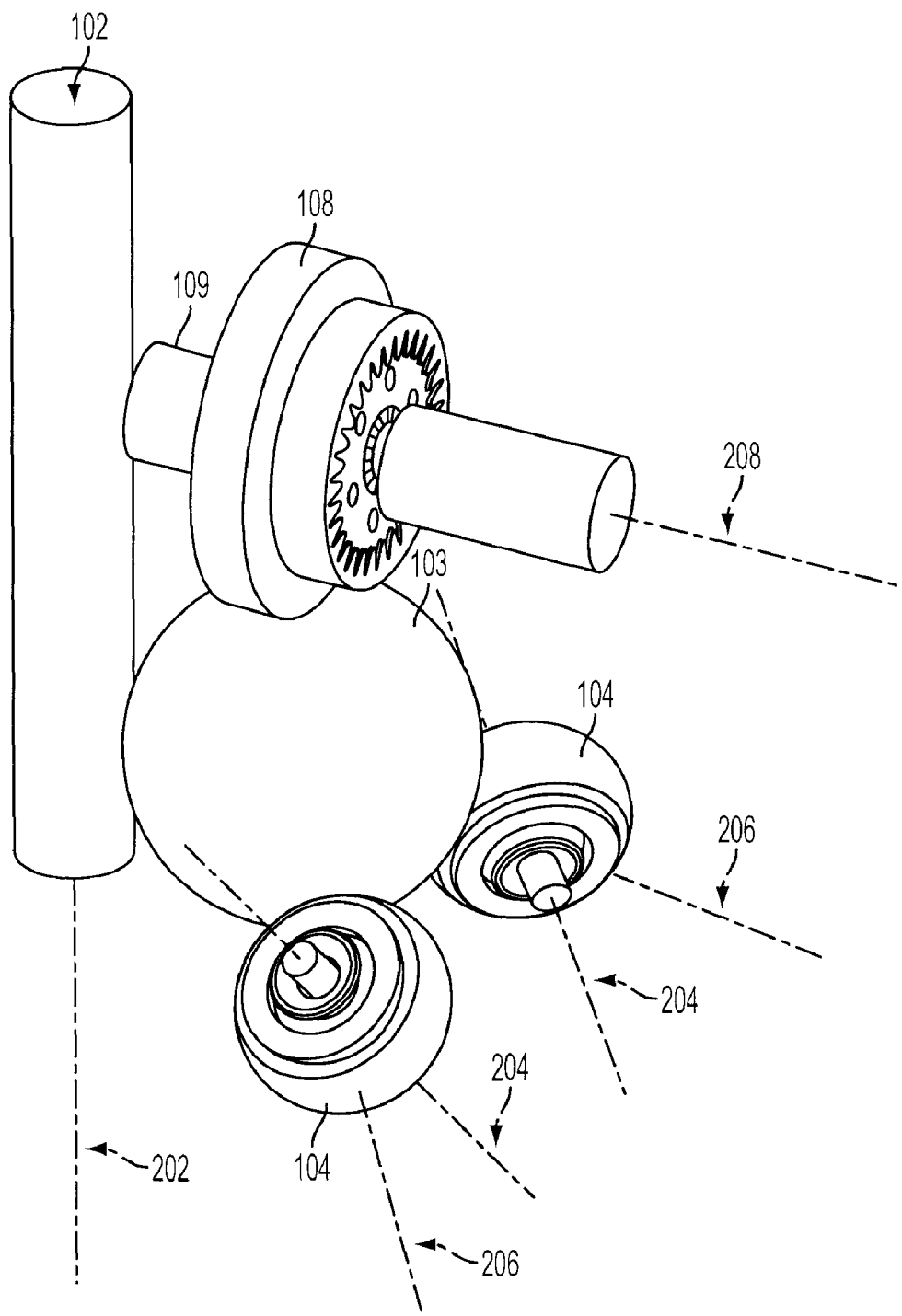
FIG. 2 illustrates certain components a single CVT from FIG. 1. Support and other structures have been omitted in order to explain the kinematics of the CVT.

Referring now also FIG. 2, which illustrates a single CVT as shown in FIG. 1, the rotational axis of each component is shown as a dashed line. Preferably the axis 208 of output roller 108 is perpendicular to the axis 202 of common rotating shaft 102. The axes 206 of the two steering cups 106 intersect at the center of sphere 103, and preferably are perpendicular to one another. Preferably the axis of each steering cup 106 differs from the axis of common rotating shaft 102 by 45 degrees, and is skew to it. Each sphere 103 is also in rolling contact with output roller 108 affixed to shaft 109, such that rotation of sphere 103 causes rotation of output roller 108 and shaft 109. Shaft 109 is rotatably attached to the body (not shown) of the transmission or other support structure by bearings.

Figure 3:
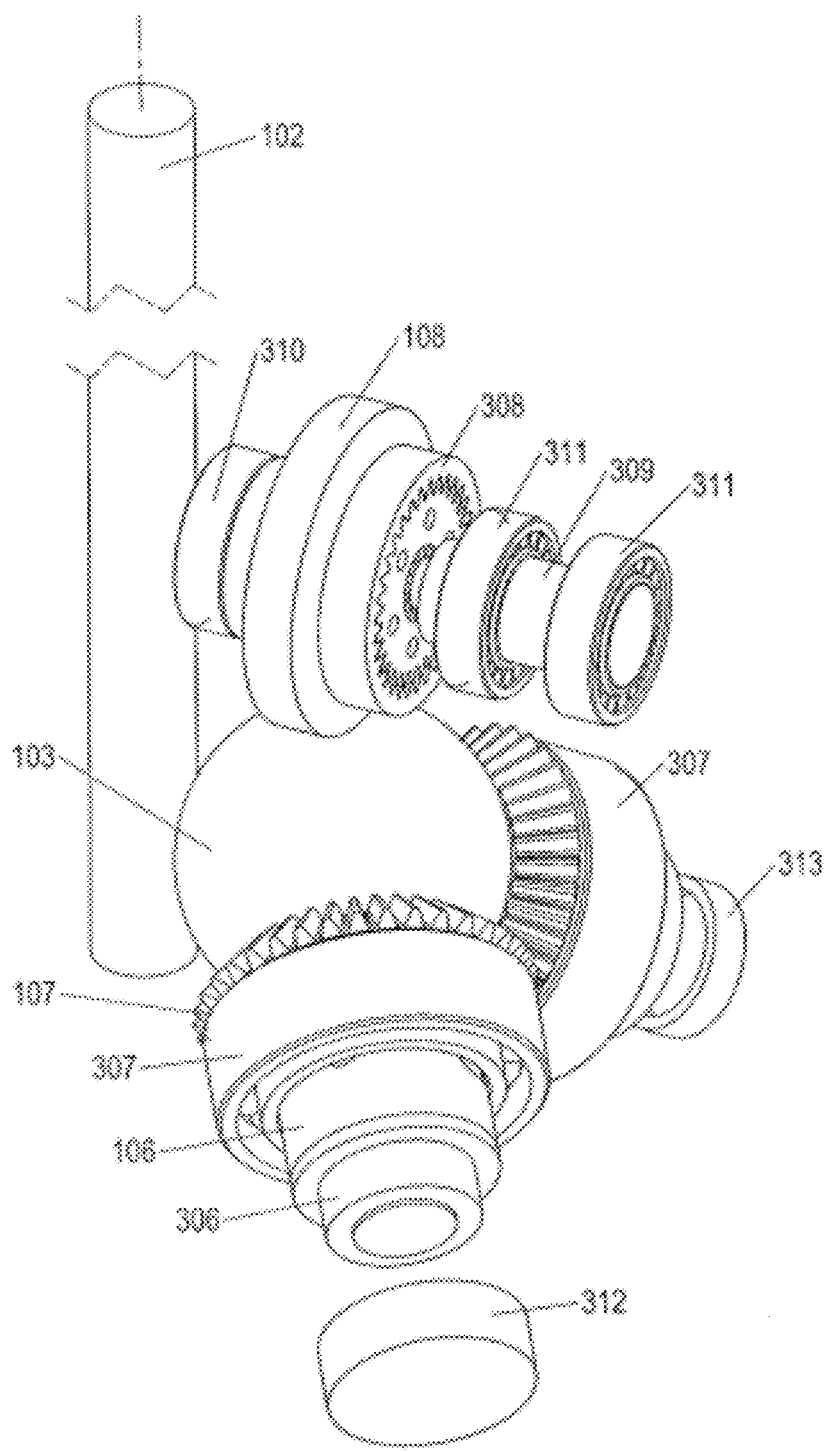
FIG. 3 illustrates the CVT of FIG. 2, with the additional synchronization gears and bearings, and a cable pulley coupled with its output.

Referring now also to FIG. 3, synchronization of the steering cups 106 is accomplished in a preferred embodiment by gears 107. Synchronization gears 107 cause steering cups 106 to turn in opposite direction, such that steering rollers 104 within steering cups 106 properly determine the axis of rotation of sphere 103. An actuator 312 may drive the orientation of steering cup 106. In a preferred embodiment the actuator may be an ultrasonic motor, the rotor of which is shown in FIG. 3 as rotor 306. In other embodiments synchronization could be accomplished by separately actuating the two steering cups 106.

Generally a sensor 313 is preferred for reading the angle of at least one steering cup 106 for each CVT, and for providing feedback to a control computer or motor controller in order to accurately control the angle and angular velocity of steering cup 106. The sensor may be any of the many known types of rotational sensor. One preferred example is a sensor comprising a magnet mounted to the steering cup and a pair of analog Hall sensors, which give output voltages proportional to the sine and cosine of the angle of the magnet, and thus of steering cup 106. In other embodiments a sensor might not be needed, for instance if rotor 306 is part of a stepper motor.

Output roller 108 produces a rotational output. In a preferred embodiment the rotational output pulls a cable, which may communicate to, for example, a joint of a prosthetic or robotic hand. In a preferred embodiment the rotational output is increased in torque and decreased in speed by a gear reduction 308 which drives a pulley 309, upon which said cable is wrapped.

In FIG. 3, some of bearings for supporting rotational elements are shown, although all stationary support structures are suppressed. Bearings 307 support steering cups 106 and synchronization gears 107. Bearing 310 supports output roller 108. Bearings 311 support pulley 309.

Figure 4:
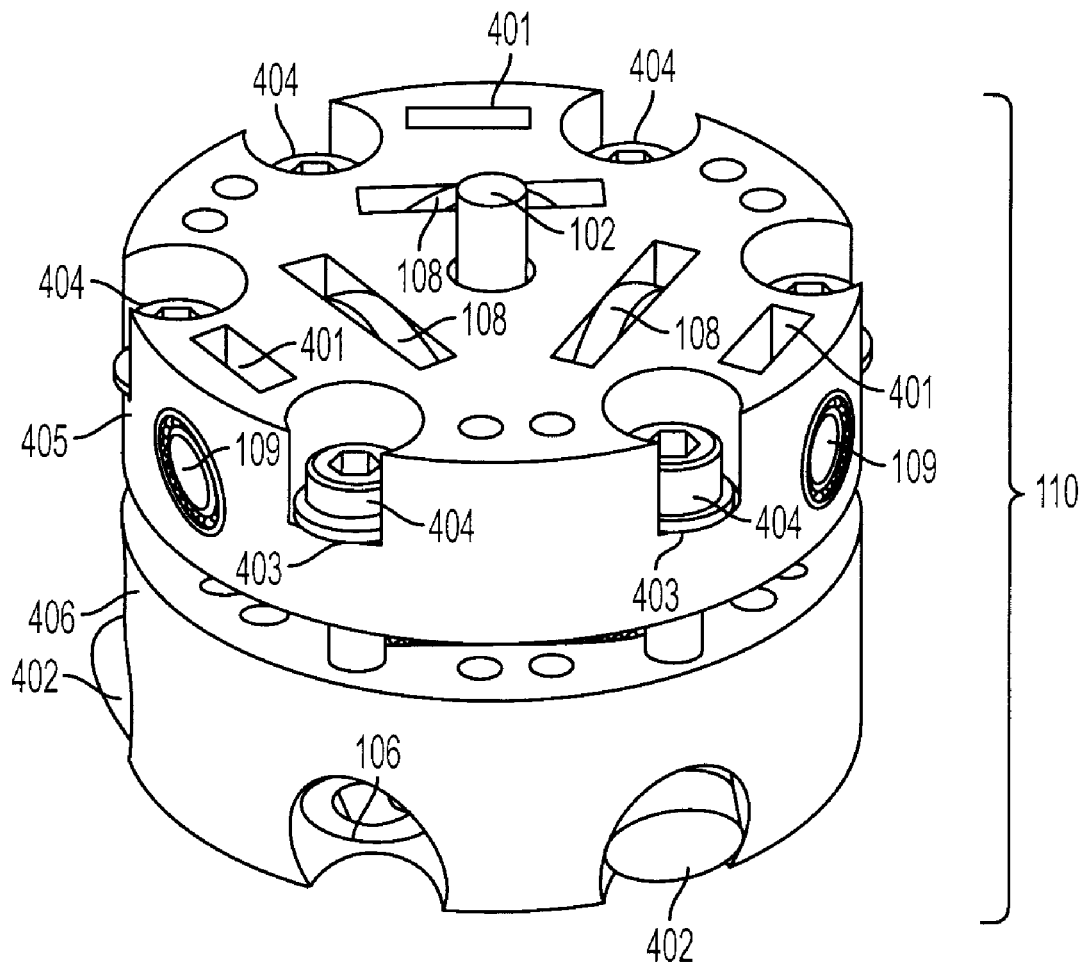
FIG. 4 is a perspective illustration of one layer of the transmission of FIG. 1 with support structures shown.
Figure 5:
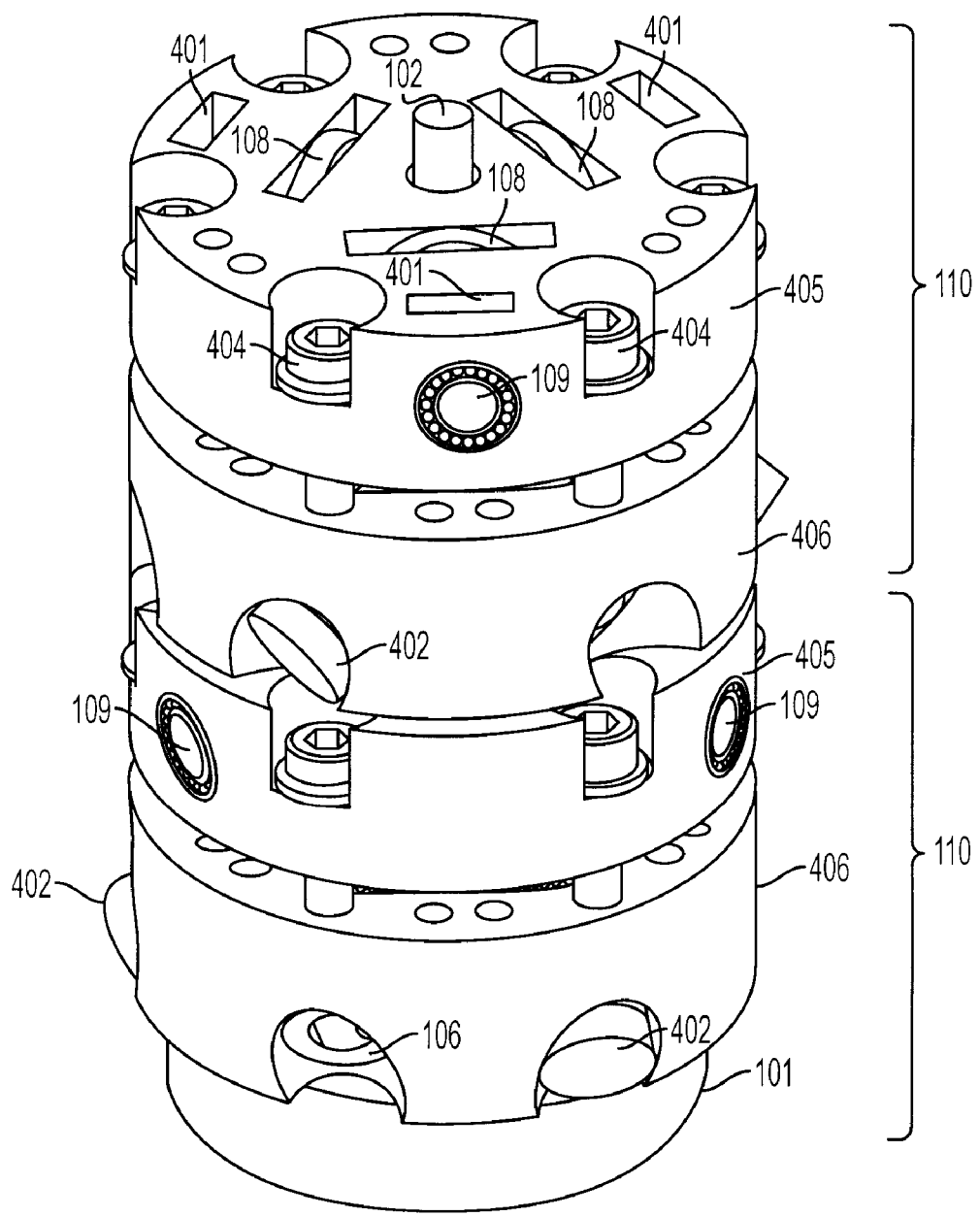
FIG. 5 is a perspective illustration of the transmission of FIG. 1 with support structures shown.

Referring now also to FIGS. 4 and 5, an example of support structure for each layer of CVTs 110 is a body formed of two disk-shaped structures, referred to herein as "disks." In a preferred embodiment of this example, an upper disk 405 and a lower disk 406 are held together by bolts 404 with belleville washers 403, such that belleville washers 403 serve to maintain a tension for pulling disks 405 and 406 together. One advantage of this structure is that pulling the two disks together preloads all the frictional rolling contacts—the steering rollers and output roller against the sphere—in each of the several CVTs in the layer. However, other or additional methods and structures of preloading can be substituted or used. Each slots 401 gives access for a cable wound around a pulley 309. Stator 402 of a motor which drives steering cup 106 may be seen in this figure, for a preferred embodiment in which one ultrasonic motor drives one of each pair of steering cups 106.

The foregoing transmission is particularly useful for, and used advantageously in, cobots requiring the establishment of mechanically constrained velocity ratios among several degrees of freedom in a workspace control. The ratios can, preferably, be made continuously variable between positive and negative values, including zero, and may be varied by electromechanical actuators under computer control. The transmission relates the output speeds one to another under computer control, and thus makes possible the establishment of virtual surfaces and other haptic effects in a multidimensional workspace to which the transmission outputs are kinematically linked. One exemplary application of the transmission is for prosthetic or robotic limbs, such as arms and fingers. The transmission or actuator can be made small enough to fit inside of, for example, a prosthetic or robotic wrist.

The foregoing description is of exemplary and preferred embodiments of a continuously variable transmission employing at least in part certain teachings of the invention. The invention is not limited to the described examples or embodiments. Alterations and modifications to the disclosed embodiments may be made without departing from the invention. The meaning of the terms used in this specification are, unless expressly stated otherwise, intended to have ordinary and customary meaning and are not intended to be limited to the details of the illustrated structures or the disclosed embodiments. None of the foregoing description is to be read as implying that any particular element, step, or function is an essential element which must be included in the claim scope.

The scope of patented subject matter is defined only by the issued claims. None of these claims are intended to invoke paragraph six of 35 USC §112 unless the exact words "means for" or "steps for" are followed by a participle.

What is claimed is:

1. A transmission system, comprising;
a central input shaft, having a central axis of rotation, for coupling to a source of rotational motion; and
a plurality of continuously variable transmission units coupled with the central input shaft, at least two of which are spaced from one another along the central axis of rotation of the central input shaft, each of the plurality of continuously variable transmission units coupling rotational motion from the central input shaft to a separate one of a plurality of rotating outputs, at least one of the plurality of continuously variable transmission units having a transmission ratio that is adjustable independently from at least one of the other of the continuously variable transmission units;
wherein, each of the at least two continuously variable transmission units that are spaced from one another along the central axis of the central input shaft is comprised of a sphere, contacting the central input shaft, for coupling the central input shaft with one of the plurality of rotating outputs, and at least one steering roller in contact with the sphere, the steering angle of the at least one steering roller determining at least in part the transmission ratio of the at least one of the plurality of continuously variable transmission units.

2. The transmission system of claim 1, further comprising a second steering roller, wherein the steering rollers are coupled for synchronous rotation of their steering angles.

3. The transmission system of claim 1, further comprising a rotational sensor coupled to at least one of the steering rollers for sensing the steering angles of the steering rollers.

4. The transmission system of claim 1, further comprising an actuator for steering at least one of the steering rollers.

5. The transmission system of claim 1, wherein the actuator is comprised of an ultrasonic motor.

6. The transmission system of claim 1, wherein at least one of the plurality of rotating outputs is coupled with a pulley.

7. The transmission system of claim 6, wherein the at least one of the plurality of rotating outputs is coupled with the pulley through a gear reduction.

8. The transmission system of claim 1, wherein the transmission ratio of the at least one of the plurality of continuously variable transmission units is adjustable between negative ratios, in which the central input shaft and the rotary output of each of the at least one of the plurality of continuously variable transmission units rotate in opposite directions, and positive ratios, in which the central input shaft and the rotating output of each of the at least one of the plurality of continuously variable transmission units rotate in the same direction, including a transmission ratio of zero, in which the rotary output of the each of the at least one continuously variable transmission units does not rotate when the central input shaft rotates.

9. A transmission system, comprising;
a central input shaft, with a central axis of rotation, for coupling to a source of rotational motion; and a plurality of continuously variable transmission units, at least two of which continuously variable transmission units are arrayed circumferentially around a central input shaft in a layer, and at least two of which are spaced from one another along the central axis of rotation of the central input shaft; each of the plurality of continuously variable transmission units coupling rotational motion from the central input shaft to a separate one of a plurality of rotating outputs and comprising a sphere, contacting the central input shaft, for coupling the central input shaft with one of the plurality of rotating outputs, and at least one independently steerable steering roller in contact with the sphere, the steering angle of the steering roller determining at least in part the transmission ratio of the continuously variable transmission unit.

10. The transmission system of claim 9, wherein the layer in which the plurality of transmission units is positioned at a first axial location on the central input position, and wherein the transmission system further comprises a second plurality of continuously variable transmission units arrayed circumferentially around the central input shaft in a second layer positioned at a second axial location on the central input shaft.

11. The transmission system of claim 9, wherein the plurality of continuously variable transmission units is supported by a body structure, and wherein the body structure is comprised of two parts that, when connected, preloads rolling contacts between the sphere and the steering roller and the sphere and an output roller coupled with the rotational output.

12. The transmission system of claim 11, wherein each of the two parts of the support structure is comprised of a generally disk-shaped element.

13. The transmission system of claim 9, wherein the transmission ratio of each continuously variable transmission units is adjustable between negative ratios, in which the central input shaft and the rotary output of each of the at least one of the plurality of continuously variable transmission units rotate in opposite directions, and positive ratios, in which the central input shaft and the rotating output of each of the at least one of the plurality of continuously variable transmission units rotate in the same direction, including a transmission ratio of zero, in which the rotary output of the each of the at least one continuously variable transmission units does not rotate when the central input shaft rotates.

14. A robotic system comprising:
  at least one robotic limb having a plurality of joints;
  a source of rotational motion; and
  a transmission system, comprising,
    a central input shaft, having a central axis of rotation, for coupling to the source of rotational motion; and
    a plurality of continuously variable transmission units coupled with the central input shaft, at least two of which are spaced from one another along the central axis of rotation of the central input shaft, each of the plurality of continuously variable transmission units comprising a sphere contacting the central input shaft for coupling rotational motion from the central input shaft to a separate one of a plurality of rotating outputs, at least one of the plurality of continuously variable transmission units having a transmission ratio that is adjustable independently from at least one of the other of the continuously variable transmission units;
  each of the plurality of continuously variable outputs coupled to different ones of the plurality of joints.

15. The robotic system of claim 14, wherein the plurality of continuously variable transmission units are arrayed circumferentially around the central input shaft.

16. The transmission system of claim 14, wherein at least one of the continuously variable transmission units is comprised of a sphere for coupling the central input shaft with one of the plurality of rotating outputs, and at least one steering roller in contact with the sphere, the steering angle of the at least one steering roller determining at least in part the transmission ratio of the at least one of the plurality of continuously variable transmission units.

17. The robotic system of claim 14, wherein the robotic limb comprises a cobot.

18. The robotic system of claim 14, wherein the robotic limb comprises a prosthetic limb.

19. The transmission system of claim 14, wherein the transmission ratio of the at least one of the plurality of continuously variable transmission units is adjustable between negative ratios, in which the central input shaft and the rotary output of each of the at least one of the plurality of continuously variable transmission units rotate in opposite directions, and positive ratios, in which the central input shaft and the rotating output of each of the at least one of the plurality of continuously variable transmission units rotate in the same direction, including a transmission ratio of zero, in which the rotary output of the each of the at least one continuously variable transmission units does not rotate when the central input shaft rotates.

* * * * *